United States Patent [19]

Boudin

[11] 4,319,605
[45] Mar. 16, 1982

[54] PRESSURE EQUALIZATION MEANS

[76] Inventor: Jacques Boudin, 90 Wheatsheaf Rd., Ivyland, Pa. 18974

[21] Appl. No.: 965,380

[22] Filed: Nov. 30, 1978

[51] Int. Cl.³ .............................................. F17C 13/00
[52] U.S. Cl. .................................................. 137/590
[58] Field of Search ............. 137/376, 343, 350, 590, 137/592; 220/22, 20, 85 B, 20.5

[56] References Cited

U.S. PATENT DOCUMENTS

| | | | |
|---|---|---|---|
| 1,978,015 | 10/1934 | Erdman | 137/590 |
| 2,001,873 | 5/1935 | Hansson | 220/85 B |
| 2,353,530 | 7/1944 | Walker | 137/590 |
| 2,696,185 | 12/1954 | Snoddy | 220/22 |

Primary Examiner—Gerald Goldberg
Assistant Examiner—Denis E. Corr

[57] ABSTRACT

A fluid treatment tank having a fluid barrier between the tank outlet and the tank bottom to thereby form an upper volume above the barrier and a lower volume below the barrier. Said tank also having a substantially fluid-tight pressure equalization means which communicates with the upper and lower volumes to equalize the pressure therebetween without a reduction of the total pressure in the tank.

4 Claims, 6 Drawing Figures

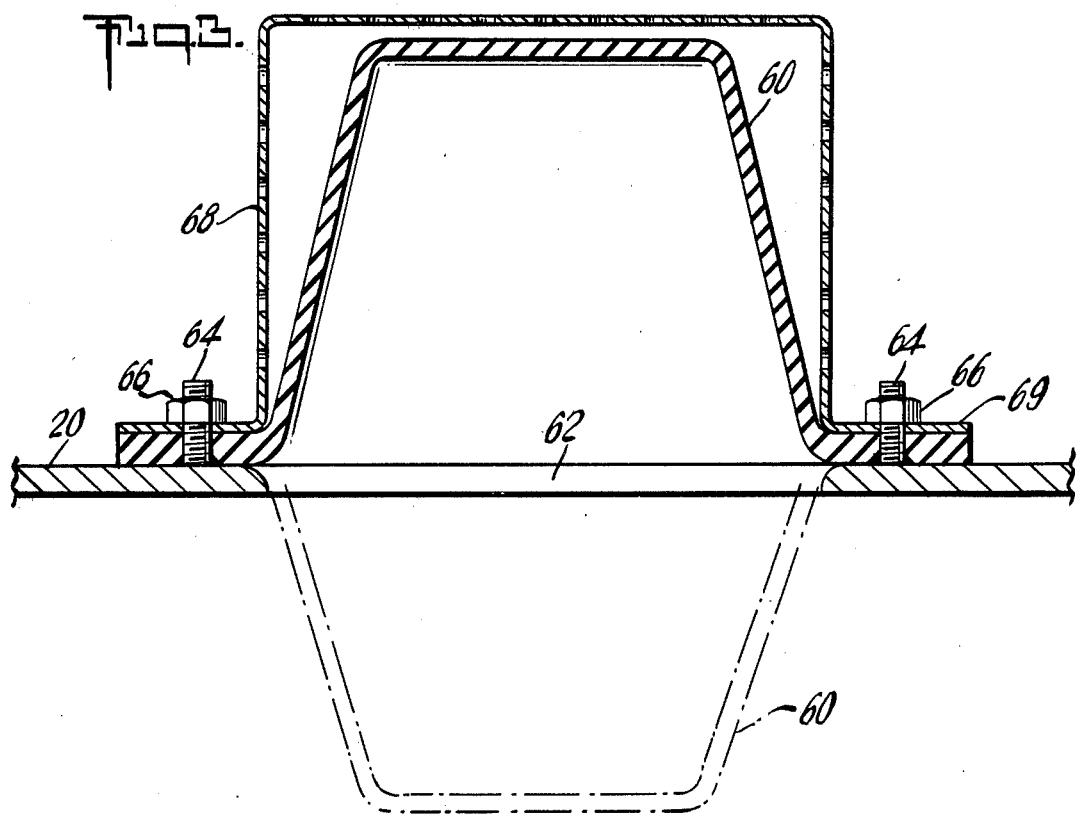
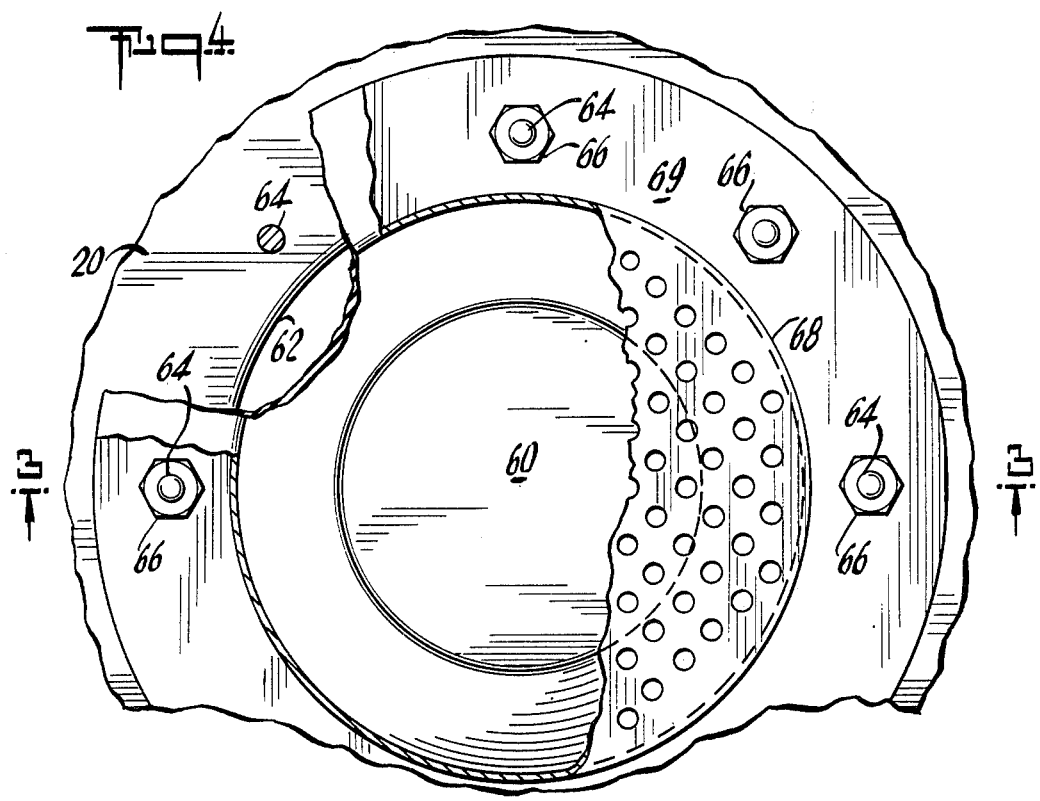

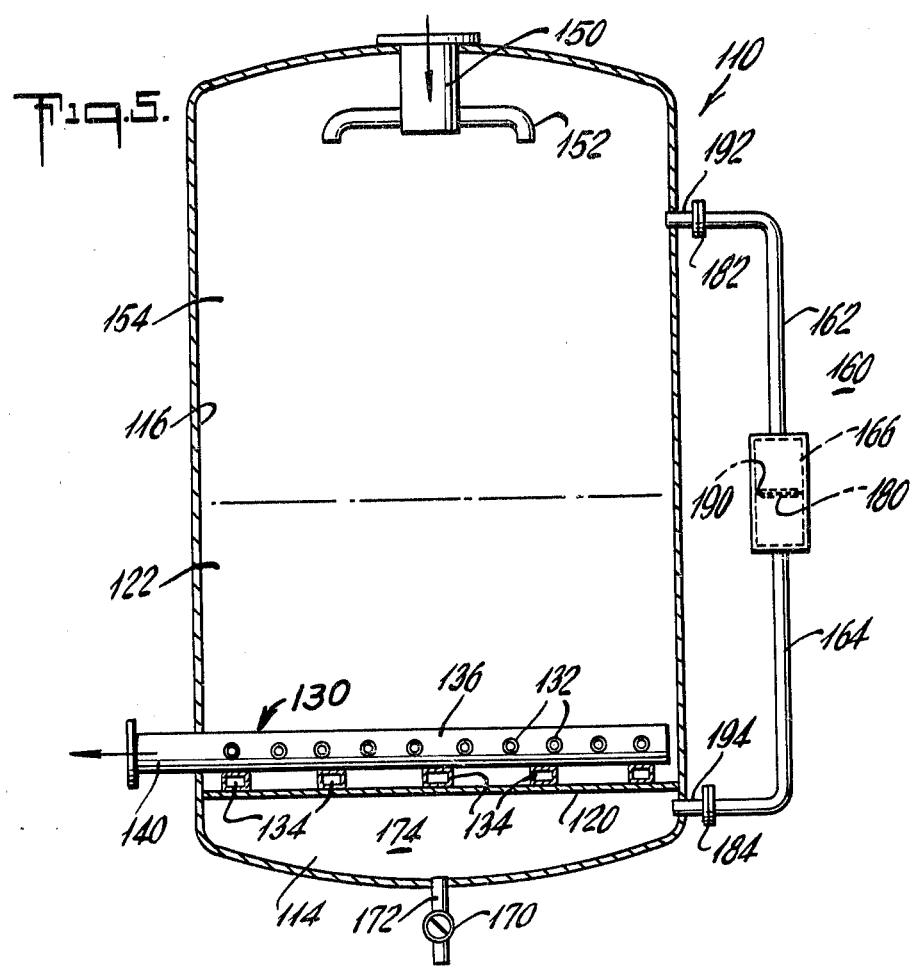
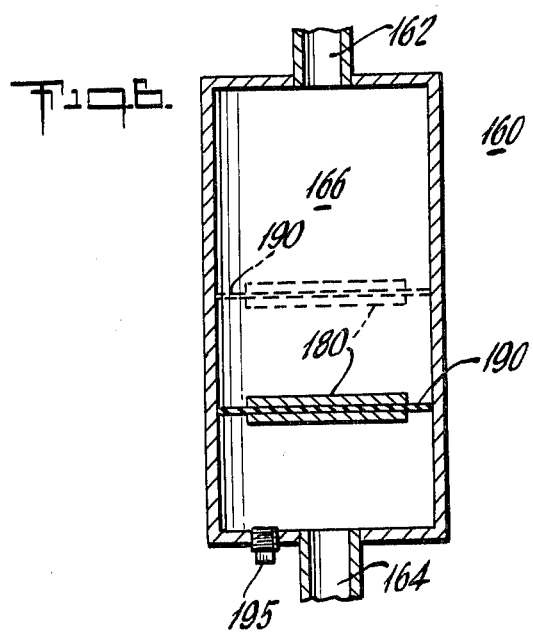

PRESSURE EQUALIZATION MEANS

BACKGROUND AND SUMMARY OF THE INVENTION

In many applications where fluids are processed or stored, spherical tanks or cylindrical tanks having dished heads are utilized because of their relatively high pressure ratings compared to conventional, flat bottomed vessels of comparable wall thickness. However, spherical tanks and cylindrical tanks with dished heads have certain disadvantages. In applications such as ion exchange where the outlet is located above the tank bottom and is supplied by an underdrain across the tank, it has been necessary to support the underdrain with a barrier designed to withstand the full hydraulic pressure of the tank. This has been accomplished in some prior art vessels by installing a heavy steel plate across the diameter of the tank and supporting the plate on a layer of cement, or on a steel structure capable of withstanding the full internal tank pressure. In other prior art vessels a lightweight plate, commonly referred to as a false bottom, is installed across the diameter of the tank and an equalization leg is installed inside the tank to intermix the fluid above and below the false bottom to thereby equalize the pressure above and below the underdrain. In still other vessels the lower dished head is filled with a cured-in-place resin or with ion exchange resin.

The above-noted methods have proven to be generally unsatisfactory. Installation of a heavy steel plate and requisite supporting means across the internal cross-sectional area of the vessel increases the overall cost and weight of the vessel. Use of a cured-in-place resin may be prohibitively expensive, and the vapors emitted during the curing process may be toxic or explosive. The use of ion exchange resin below the underdrain of an ion exchange vessel or the use of a false bottom together with an internal equalization leg to intermix fluid above and below the false bottom also present disadvantages. Over an extended period of time ion exchange resin and the water treated in an ion exchange vessel are both corrosive to carbon steel vessels. The area of the vessel in which the ion exchange resin or water is present must, therefore, be lined with a corrosion resistant material, such as rubber. Thus, if ion exchange resin is used as a supporting means, or if water enters the dished area below the underdrain, the area below the underdrain also must be coated, which increases the cost and usually requires the addition of an extra manhole through which the coating operation is performed. Moreover, if an internal equalization leg is used, it must also be coated inside and out to protect against corrosion, thereby further increasing the overall cost of the vessel.

An object of the present invention is to provide a tank with underdrain which is relatively inexpensive to fabricate while still being corrosion resistant.

The present invention comprises installation of a fluid barrier between the tank outlet and the tank bottom to thereby form an upper volume above the barrier and a lower volume below the barrier. A substantially fluid-tight pressure equalization means communicates with the upper and lower volumes to equalize the pressure therebetween without a reduction of the total pressure in the tank. In one embodiment the pressure equalization means is located within the tank, while in another embodiment the equalization means is located external to the tank.

BRIEF DESCRIPTION OF THE DRAWINGS

FIG. 3 is an enlarged sectional view of the diaphragm taken along line 3—3 of FIG. 4 showing the diaphragm in solid in the undeformed position and in broken lines in the deformed position.

FIG. 4 is a partial plan view of the diaphragm of FIG. 3.

FIG. 5 is an elevational view in section of a vertical dished tank incorporating another embodiment of this invention.

FIG. 6 is an enlarged partial elevational view in section of the piston means of FIG. 5 showing the piston means in solid in one position and in broken lines in another position.

DETAILED DESCRIPTION OF THE INVENTION

Figure 1:
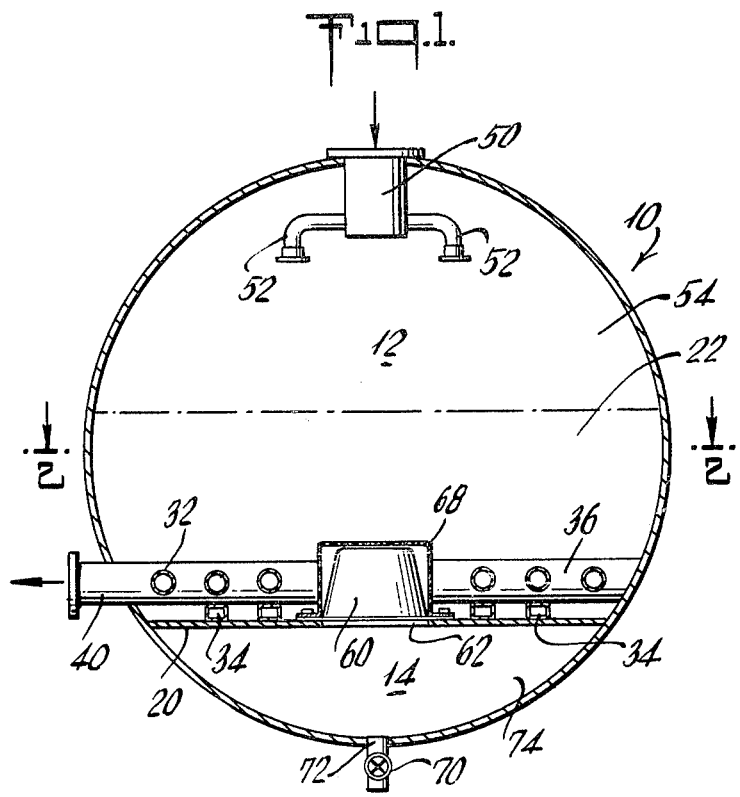
FIG. 1 is an elevational view in section taken along line 1—1 of FIG. 2 of a spherical tank incorporating one embodiment of this invention.
Figure 2:
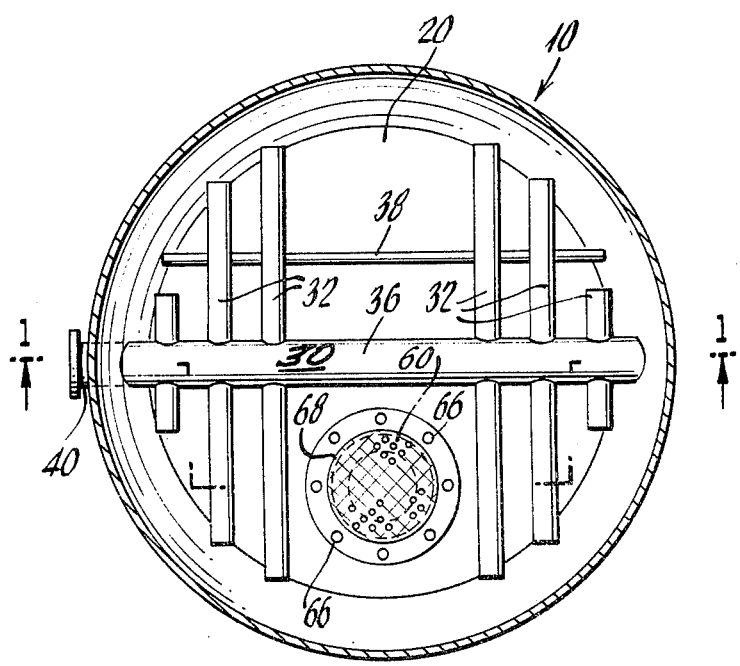
FIG. 2 is a plan view in section taken along line 2—2 of FIG. 1.

Referring to FIGS. 1, 2, 3 and 4, a spherical tank generally indicated as 10 is shown having an upper volume 12 containing ion exchange resin 22, and a lower sealed volume 14 containing fluid, such as non-corrosive fluid 74, the volumes separated by a fluid barrier 20 extending across the tank. A fluid collection means, such as underdrain 30 is supported off barrier 20 by spacers 34. Underdrain 30 comprises a central header 36 communicating with outlet 40 extending through upper volume 12, and a plurality of branched perforated pipes 32 extending horizontally from the header and supported, in part, by bars 38 anchored to the walls of tank 10. Barrier 20 has an opening 62 therethrough and a plurality of studs 64 affixed to the barrier around the circumference of the opening. Inlet 50 extending into volume 12 communicates with fluid distributor 52 disposed in tank 10. A fluid-tight pressure equalization means, such as preformed deformable diaphragm 60, enveloping opening 62 is retained in position by bolts 66 affixed to studs 64. Diaphragm 60 operates to divide the tank into a first volume on one side of the diaphragm generally including upper volume 12, and a second volume on the other side of the diaphragm generally including lower volume 14. A perforated shield 68 preferably is added above barrier 20 to protect diaphragm 60 from damage during physical inspection and manual cleaning of tank 10. Shield 68 is shown retained in position by lugs 64 and bolts 66 which also retain diaphragm 60 in position. As shown most clearly in FIG. 3, the bottom flange 69 of shield 68 effectively compresses the edge of diaphragm 60 through tightening of nuts 66 thereby forming a leak tight seal between upper volume 12 and lower volume 14. Should diaphragm 60 become damaged it can be replaced relatively easily after removal of bolts 66 and shield 68. Valve 70 and a nozzle 72 communicating with volume 14 are mounted externally on the centerline of the lower volume to permit the addition and removal of non-corrosive fluid 74.

Referring to FIGS. 5 and 6, another embodiment of this invention is shown. A vertical dished tank, generally indicated as 110, is shown having upper dished head 112, lower dished head 114, the heads being separated by cylindrical section 116 in which ion exchange resin 122 is disposed. Upper dished head 112 is shown having a fluid distributor 152 extending from fluid inlet 150. Fluid barrier 120 extending across the tank divides the tank into a first, upper volume above barrier 120 including most of cylindrical section 116 and upper dished head 112, and a second, lower volume below the barrier including lower dished head 114. The exact location of fluid barrier 120 may vary provided that inlet 150 and outlet 140 are both above the barrier. A fluid collection means such as underdrain 130 comprises central header 136 communicating with outlet 140 in the lower portion of cylindrical section 116 and a plurality of branched perforate pipes 132 extending horizontally from the header. Underdrain 130 is supported off fluid barrier 120 by spacers 134. A pressure equalization means, such as pressure equalization leg 160, shown mounted externally on tank 110, comprises an upper fluid conduit 162, a lower fluid conduit 164, and a piston chamber 166 communicating with the upper and lower fluid conduits. Flange 182 on upper fluid conduit 162 is brought into fluid-tight engagement with flanged nozzle 192 on cylindrical section 116 by bolts (not shown). Similarly, flange 184 on lower fluid conduit 164 is brought into fluid-tight engagement with flanged nozzle 194 on lower dished head 114 by bolts (not shown). A piston means, such as cylindrical piston 180, is disposed in piston chamber 166, the piston having an annular seal 190 affixed thereto to permit reciprocal movement of the piston without permitting fluid in the upper and lower fluid conduits, 162, 164, respectively, to intermix. An external nozzle 172 and valve 170 are provided on the lowest part of dished head 114 to permit the addition and removal of fluid, such as non-corrosive fluid 174, from the lower dished head and lower fluid conduit 164. A vent plug 195 is added on the lower portion of piston chamber 166 to permit air to escape during the filling of lower dished head 114, lower fluid conduit 164 and piston chamber 166 below piston 180. While the location of vent plug 195 on the bottom of piston chamber 166 will result in a small amount of air being entrapped in the chamber, this small amount of air should not adversely affect the operation of equalization leg 160. Location of plug 195 higher on piston chamber 166 would result in less air being entrapped, but might adversely affect the effectiveness and life of annular seal 190.

Referring again to FIGS. 1, 2, 3 and 4, section 14 located below fluid barrier 20 in tank 10 is filled with noncorrosive fluid 74 through valve 70, afterwhich the valve is closed. Care must be used upon initial fill of lower volume 14 to vent trapped air by loosening bolts 66, and then retightening them when the liquid level reaches opening 62. As process fluid 54 passes downwardly through tank 10 from inlet 50 and fluid distributor 52, it contacts ion exchange resin 22 to thereby remove undesired ions from the fluid. Downwardly flowing process fluid 54 then passes through branched perforate pipes 32 into central header 36 of underdrain 30, exiting tank 10 through outlet 40. Initially, when the hydraulic pressure exerted by fluid 54 in the first volume is equal to the hydraulic pressure exerted on the diaphragm by fluid 74 in the second volume, diaphragm 60 will be in the initial preformed position shown by the solid lines in FIG. 3. As the hydraulic pressure in the first volume increases and the total pressure in the tank remains constant, diaphragm 60 is immediately deformed toward opening 62 and toward the second volume as shown by the broken lines in FIG. 3, thereby increasing the pressure in the second volume until the pressures in the first and second volumes are equalized. Similarly it is obvious that as the pressure exerted on diaphragm 60 by the first volume decreases, the amount of diaphragm deformation also decreases. Diaphragm 60 may also be designed to relieve excessive pressure in the second volume by expanding upwardly into section 12. Such a condition might occur if fluid 74 in the second volume were heated. An ancillary benefit of this embodiment is that diaphragm 60 may be designed to operate as a rupture disc to prevent damage to fluid barrier 20 when excessive hydraulic pressure is present in the first volume.

It is thought that in a spherical tank 10 having an 11 foot diameter operating at 750 PSIG with fluid barrier 20 installed 2 feet above the bottom, a 14 inch diameter, 3/16" inch thick diaphragm 60 bolted above opening 62 in the barrier should provide adequate pressure equalization. While diaphragm 60 may be constructed of any material having acceptable elasticity, resilience and chemical resistance, it is believed that diaphragms constructed of natural rubber will prove acceptable for many applications.

It is believed that a preformed diaphragm such as that shown in FIG. 3 will exhibit less stress in deformation than a planar, non-preformed diaphragm. Planar and other shaped diaphragms may prove satisfactory, however.

Referring to FIGS. 5 and 6, the pressure equalization leg 160 is shown mounted external to tank 110. Prior to tank 110 being put into service, non-corrosive fluid 174 is pumped into lower dished head 114, lower fluid conduit 164 and a slight portion of piston chamber 166 through valve 170 and nozzle 172 afterwhich the valve is closed and vent plug 195 is tightened. Process fluid 154 entering tank 110 through inlet 150 and distributor 152 first fills cylindrical section 116, upper fluid conduit 162 and a portion of piston chamber 166. The fluid then passes downwardly through cylindrical section 116 contacting ion exchange resin 122. The process fluid then passes through branched perforated pipes 132 into central header 136 of underdrain 130 and exits through outlet 140. In normal operation the fluid level in the first volume above barrier 120 also should be above nozzle 192 to vent all air from upper fluid conduit 162 prior to start-up. The pressure in the first volume above the barrier 120 and the second volume below the barrier will be equalized through equalization leg 160, with piston 180 and seal 190 preventing intermixing of process fluid 154 and non-corrosive fluid 174. With the total pressure in the tank constant when the hydraulic pressure above barrier 120 increases, fluid is displaced from cylindrical section 116 through nozzle 192 and conduit 162 forcing piston 180 downwardly from the position shown in broken lines in FIG. 6 to the position shown in solid. This in turn increases the pressure of non-corrosive fluid 174 in fluid conduit 164 and dished head 114 until the pressures above and below barrier 120 are again equalized. Conversely, when the fluid pressure below barrier 120 exceeds that above the barrier, fluid 174 flows through nozzle 194 and conduit 164 forcing piston 180 upwardly. This rise of piston 180 forces the piston to displace process fluid 154 through conduit 162 and into cylindrical section 116 until the pressures above and below barrier 120 are again equalized. While the exact dimensions of equalization leg 160 will be dependent upon the pressure variations, the fluid properties, and the desired response time, it is believed that for a 2500 gallon, 8 foot diameter vertical tank, a piston chamber 166 8 inches in diameter, and 24 inches high with fluid conduits 162, 164 each 1 inch in diameter should prove satisfactory. Piston 180 may be constructed of any material having the requisite buoyancy and chemical resistance, while seal 190 should be constructed of a material which is chemically resistant to the fluids, somewhat elastic and long wearing.

It should be noted that neither embodiment is restricted to a particular type of tank design. It is anticipated that differing tank and nozzle configurations may be utilized depending upon the particular application. While the embodiments described herein have been discussed in relation to their use on ion exchange tanks, it is clear that this invention is not restricted solely to ion exchange applications. Certain modifications to the invention described and claimed herein will be obvious to those skilled in the art without departing from the spirit of the invention and are considered to be within the scope of the claims appended hereto.

I claim:

1. In a fluid treatment tank of the type having an inlet, an underdrain disposed above the tank bottom, and an outlet communicating with the underdrain, the improvement comprising:
   A. a substantially rigid barrier extending across the tank and disposed in the tank between the underdrain and the tank bottom to divide the tank into a first volume and a second volume, substantially all of said first volume located above said barrier and substantially all of said second volume located below said barrier, said first volume and said second volume each adapted to contain fluid without intermixing therebetween, said rigid barrier having an opening therethrough; and
   B. a diaphragm being positioned on said rigid barrier to completely cover said opening, said diaphragm communicating with the fluids in said first volume and said second volume, whereby fluid pressure is transmitted through the opening to said diaphragm causing said diaphragm to flex toward the volume of lower pressure to thereby equalize the pressure between said volumes.

2. In a fluid treatment tank of the type having an inlet, an underdrain disposed above the tank bottom, and an outlet communicating with the underdrain, the improvement comprising:
   A. a fluid barrier disposed in the tank between the underdrain and the tank bottom to divide the tank into a first volume and a second volume, substantially all of said first volume located above said barrier and substantially all of said second volume located below said barrier, said first volume and said second volume each adapted to contain fluid without intermixing therebetween; and,
   B. a substantially fluid-tight pressure equalization means is mounted external to the tank, said pressure equalization means communicating with the fluids in said first volume and said second volume and adapted to equalize the fluid pressure therebetween when fluid flows from the inlet through the underdrain to the outlet.

3. The tank of claim 2 wherein said pressure equalization means comprises:
   A. a first fluid conduit communicating with said first volume and with a piston chamber;
   B. a second fluid conduit communicating with said second volume and with a piston chamber;
   C. a piston chamber communicating with said first and second fluid conduits, said piston chamber adapted to enclose a piston means; and
   D. a piston means disposed in said piston chamber for reciprocal motion therein, whereby fluid pressure forces fluid to flow from the volume of higher pressure through its respective fluid conduit into said piston chamber forcing said piston means toward the volume of lower pressure to thereby equalize the pressures between said first volume and said second volume.

4. In a tank of the type having an inlet, an underdrain disposed above the tank bottom, an outlet communicating with the underdrain, and a fluid barrier positioned in the tank between the underdrain and the tank bottom to divide the internal volume of the tank into a first volume and a second volume, substantially all of the first volume located above the barrier and substantially all of the second volume located below the barrier, the first volume and the second volume adapted to contain fluids without intermixing therebetween, the improvement comprising: adding a substantially fluid-tight pressure equalization means to the tank communicating with the first and second volumes, said pressure equalization means comprising:
   A. a first fluid conduit communicating with the first volume and with a piston chamber;
   B. a second fluid conduit communicating with the second volume and with a piston chamber;
   C. a piston chamber communicating with the first and second fluid conduits, said piston chamber adapted to enclose a piston means; and
   D. a piston means disposed in said piston chamber for reciprocal motion therein, whereby fluid pressure forces fluid to flow from the volume of higher pressure through its respective fluid conduit into said piston chamber forcing said piston means toward the volume of lower pressure to thereby equalize the pressures between the first volume and the second volume; whereby said pressure equalization means acts in response to fluid pressure changes in the volumes so as to equalize fluid pressures between the first volume and the second volume.

* * * * *